(12) United States Patent
Hashimoto et al.

(10) Patent No.: US 12,479,005 B2
(45) Date of Patent: Nov. 25, 2025

(54) FUNCTIONAL FILM AND METHOD FOR PRODUCING SAME

(71) Applicant: DAI NIPPON PRINTING CO., LTD., Tokyo (JP)

(72) Inventors: Ryuji Hashimoto, Tokyo (JP); Toshihito Shimizu, Tokyo (JP); Junya Yamada, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 14 days.

(21) Appl. No.: 18/565,645

(22) PCT Filed: Jun. 10, 2022

(86) PCT No.: PCT/JP2022/023552
§ 371 (c)(1),
(2) Date: Nov. 30, 2023

(87) PCT Pub. No.: WO2022/260182
PCT Pub. Date: Dec. 15, 2022

(65) Prior Publication Data
US 2024/0139771 A1 May 2, 2024

(30) Foreign Application Priority Data

Jun. 11, 2021 (JP) .................. 2021-098273
Jun. 11, 2021 (JP) .................. 2021-098276
Apr. 21, 2022 (JP) .................. 2022-070391

(51) Int. Cl.
G02B 1/14 (2015.01)
B05D 7/00 (2006.01)

(52) U.S. Cl.
CPC ............ B05D 7/546 (2013.01); G02B 1/14 (2015.01); *B05D 2201/02* (2013.01); *B05D 2401/40* (2013.01); *B05D 2601/22* (2013.01)

(58) Field of Classification Search
CPC .. B32B 7/00–7/14; B32B 27/00–27/42; G02B 1/14–1/18; C08J 5/00–5/249
See application file for complete search history.

(56) References Cited

FOREIGN PATENT DOCUMENTS

JP 2010082860 A * 4/2010
JP 2013-142773 A 7/2013
(Continued)

OTHER PUBLICATIONS

Machine translation of JP2010082860. Retrieved May 28, 2025.*
(Continued)

*Primary Examiner* — Prashant J Khatri
(74) *Attorney, Agent, or Firm* — BURR PATENT LAW, PLLC

(57) ABSTRACT

A functional film 1 according to an embodiment includes: a substrate (10) containing an acetyl cellulose resin; a primer layer (20) containing a filler (40) and disposed on the substrate (10); and a functional layer (30) containing the filler (40) and disposed on the primer layer (20). The substrate (10) has a permeation layer (12) formed by permeation of the resin contained in the primer layer (20) into part of the substrate (10). The permeation layer (12) has a thickness of 0.1 μm or more and 3.5 μm or less. The primer layer (20) has a thickness of 0.1 μm or more and 1.0 μm or less. The filler (40) is silica particles having an average particle size of 20 nm or more and 80 nm or less. The filler (40) in the primer layer (20) has a density of ⅓ or more and ¾ or less of the density of the filler (40) in the functional layer (30). The primer layer (20) and the functional layer (30) each contain a resin. The resin component of the primer layer (20) is the same as the resin component of the functional layer 30.

4 Claims, 7 Drawing Sheets

(56) References Cited

FOREIGN PATENT DOCUMENTS

| | | | |
|---|---|---|---|
| JP | 2016132187 A | * | 7/2016 |
| JP | 2021-024913 A | | 2/2021 |

OTHER PUBLICATIONS

Machine translation of JP2016132187. Retrieved May 28, 2025.*
English translation of the International Preliminary Report on Patentability (Chapter I) dated Dec. 21, 2023 (Application No. PCT/JP2022/023552).
Japanese Office Action (Application No. 2022-070391) dated May 24, 2022 (with English translation) (6 pages).
International Search Report and Written Opinion (Application No. PCT/JP2022/023552) dated Aug. 23, 2022 (13 pages).

* cited by examiner

FUNCTIONAL FILM AND METHOD FOR PRODUCING SAME

TECHNICAL FIELD

The present invention relates to a functional film and a method for producing the functional film.

BACKGROUND ART

Functional films are members having optical functions, such as anti-reflection, or protective functions, such as hard coats and gas barriers.

A functional film may have a functional layer on a substrate. In this case, the functional layer is formed as a layer having a desired function expected for the functional film.

In general, a functional film having a functional layer on a substrate includes, as the substrate, a film containing a resin as a main component. The functional layer may be commonly made of an organic material, an inorganic material, or a combination of these materials.

The combination of an organic material and an inorganic material is, for example, a resin film made of an organic material and containing countless filler particles made of an inorganic material.

In the case of directly disposing a functional layer on a substrate, the substrate and the functional layer may fail to come into sufficient close contact with each other depending on the relationship between the material of the substrate and the material of the functional layer. In this case, the close contact between the substrate and the functional layer may be improved by disposing a primer layer therebetween.

CITATION LIST

Patent Literature

PTL 1: Japanese Unexamined Patent Application Publication No. 2021-24913

SUMMARY OF INVENTION

Technical Problem

When a functional layer contains, in a resin, filler particles made of an inorganic material, the filler particles provide a desired function, but may impair close contact between the functional layer and the substrate. In contrast, the primer layer disposed as described above may improve close contact between the functional layer and the substrate. However, when there is a limit to, for example, the thickness of the functional film, the thickness of the functional layer needs to be reduced by the thickness of the primer layer, and the number of the filler particles may be reduced. In this case, the function of the functional layer may deteriorate.

The present invention has been made in light of the above circumstances, and an object of the present invention is to provide: a functional film in which close contact between a substrate and a functional layer can be improved easily and efficiently and that further can favorably exhibit an expected function; and a method for producing the functional film.

Solution to Problem

Embodiments of the present disclosure relate to the following [1] to [11].

[1] A functional film including: a substrate containing an acetyl cellulose resin; a primer layer containing a filler and disposed on the substrate; and a functional layer containing a filler and disposed on the primer layer, wherein the substrate has a permeation layer adjacent to the primer layer and formed by permeation of a resin contained in the primer layer into part of the substrate, and the permeation layer has a thickness of 0.1 µm or more and 3.5 µm or less; the primer layer has a thickness of 0.1 µm or more and 1.0 µm or less; the filler in the primer layer and the filler in the functional layer are silica particles having an average particle size of 20 nm or more and 80 nm or less; the filler in the primer layer has a density of ⅓ or more and ¾ or less of a density of the filler in the functional layer; and the primer layer and the functional layer each contain a resin, and the primer layer has the same resin component as the functional layer.

[2] A functional film including: a substrate containing an acetyl cellulose resin; a primer layer containing a filler and disposed on the substrate; and a functional layer containing a filler and disposed on the primer layer, wherein the substrate has a permeation layer adjacent to the primer layer and formed by permeation of a resin contained in the primer layer into part of the substrate, and the permeation layer has a thickness of 0.1 µm or more and 3.5 µm or less; the primer layer has a thickness of 0.1 µm or more and 1.0 µm or less; the filler in the primer layer and the filler in the functional layer are silica particles having an average particle size of 20 nm or more and 80 nm or less; in a cross section of the functional layer in a thickness direction, 90 particles or more and 150 particles or less of the filler in the functional layer are present per 0.5 µm$^2$; in a cross section of the primer layer in the thickness direction, 15 particles or more and 45 particles or less of the filler in the primer layer are present per 0.2 µm$^2$; and the primer layer and the functional layer each contain a resin, and the primer layer has the same resin component as the functional layer.

[3] A functional film including: a substrate containing an acetyl cellulose resin; a primer layer containing a filler and disposed on the substrate; and a functional layer containing a filler and disposed on the primer layer, wherein the substrate has a permeation layer adjacent to the primer layer and formed by permeation of a resin contained in the primer layer into part of the substrate, and the permeation layer has a thickness of 0.1 µm or more and 3.5 µm or less; the primer layer has a thickness of 0.1 µm or more and 1.0 µm or less; the filler in the primer layer and the filler in the functional layer are silica particles having an average particle size of 20 nm or more and 80 nm or less; in a cross section of the primer layer in the thickness direction, 15 particles or more and 45 particles or less of the filler in the primer layer are present per 0.2 µm$^2$; and the primer layer and the functional layer each contain a resin, and the primer layer has the same resin component as the functional layer.

[4] A functional film including: a substrate containing an acetyl cellulose resin; a primer layer containing a filler and disposed on the substrate; and a functional layer containing a filler and disposed on the primer layer, wherein the substrate has a permeation layer adjacent to the primer layer and formed by permeation of a resin contained in the primer layer into part of the substrate, and the permeation layer has a thickness of 0.1 µm or more and 3.5 µm or less; the primer layer has a thickness of 0.1 µm or more and 1.0 µm or less; the filler in the primer layer and the filler in the functional layer are silica particles having an average particle size of 20 nm or more and 80 nm or less; the filler in the primer layer has a density of 15% or more and 30% or less in a cross section of the primer layer in a thickness direction; and the primer layer and the functional layer each contain a resin, and the primer layer has the same resin component as the functional layer.

In the functional films according to [1] to [4], the resin component of the primer layer refers to all resins contained in the primer layer, and the primer layer contains one or two or more resins. In other words, the resin component of the primer layer is composed of one or two or more resins contained in the primer layer. The resin component of the functional layer refers to all resins contained in the functional layer, and the functional layer contains one or two or more resins. In other words, the resin component of the functional layer is composed of one or two or more resins contained in the functional layer.

In the functional film according to [1], the primer layer may contain a single resin, and the functional layer may contain a single resin. In this case, the resin component of the primer layer and the resin component of the functional layer are the same and each composed of a single (one type of) resin.

In the functional film according to [1], the primer layer may contain two resins, and the functional layer may contain two resins. In this case, the types and mixing ratio of two components (two resins) in the resin component of the primer layer are the same as the types and mixing ratio of two components (two resins) in the resin component of the functional layer.

In the functional film according to [1], the primer layer may contain three or more resins, and the functional layer may contain three or more resins. In this case, the types and mixing ratio of components (resins) in the resin component of the primer layer are the same as the types and mixing ratio of components (resins) in the resin component of the functional layer.

[5] A method for producing a functional film including: a diluted solution applying step of applying, onto a substrate, a diluted solution prepared by diluting a first resin composition containing a filler with a solvent; a drying step of evaporating part of the solvent to leave the first resin composition uncured or semi-cured; a disposing step of disposing a second resin composition containing a filler on the diluted solution; and a curing step of curing the first resin composition and the second resin composition to form a primer layer containing a resin obtained by curing the first resin composition on the substrate and a functional layer containing a resin obtained by curing the second resin composition on the primer layer; wherein, in the diluted solution applying step, part of the first resin composition in the diluted solution permeates into the substrate; in the drying step, a residual solvent is left in the diluted solution by evaporating part of the solvent; in the disposing step, the residual solvent allows part of the second resin composition on the diluted solution to flow into the diluted solution when the second resin composition is disposed on the diluted solution; the filler in the primer layer has a lower density than the filler in the functional layer; and the filler contained in the first resin composition is the same as the filler contained in the second resin composition.

[6] The method for producing a functional film according to [5], wherein, in the disposing step, the heated second resin composition is disposed on the diluted solution.

[7] The method for producing a functional film according to claim 5 or 6, wherein a proportion of the filler in the first resin composition is equal to a proportion of the filler in the second resin composition.

[8] The method for producing a functional film according to any one of [5] to [7], wherein the solvent is a ketone solvent.

[9] The method for producing a functional film according to any one of [5] to [8], wherein the filler is silica particles having an average particle size of 20 nm or more and 80 nm or less.

[10] The method for producing a functional film according to any one of [5] to [9], wherein the first resin composition and the second resin composition are each an ionizing radiation-curable resin or a thermosetting resin.

[11] The method for producing a functional film according to [5] to [10], wherein the substrate contains an acetyl cellulose resin.

Advantageous Effects of Invention

According to the present invention, there is provided a functional film in which close contact between a substrate and a functional layer can be improved easily and efficiently and that further can favorably exhibit an expected function.

DESCRIPTION OF EMBODIMENTS

Embodiments of the present invention will be described below with reference to the drawings.

In this description, the terms "sheet", "film", "plate", "layer", and the like are not distinguished from each other on the basis of only differences in their names. Therefore, for example, the "sheet" is a concept including a member that may also be called a film, a plate, or a layer.

In this description, the term "sheet surface (plate surface, film surface) refers to a surface of a target sheet member in a planer direction (plane direction) when the target sheet member is viewed generally and comprehensively. In this description, the normal direction of a sheet member refers to the normal direction to the sheet surface of a target sheet member. In the present invention and the embodiments, the term resin may be simply used. The resin in this case means a synthetic resin.

<Functional Film>

Figure 1:
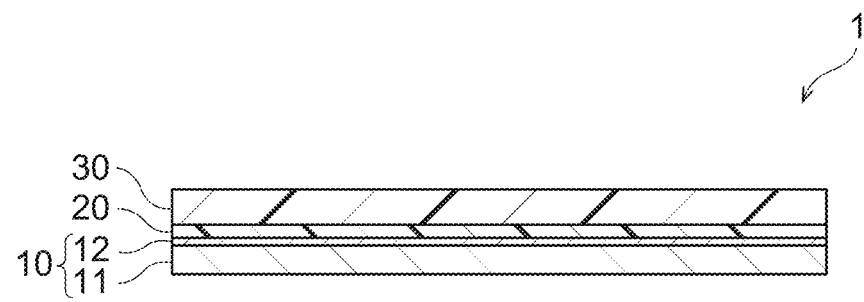
FIG. 1 is a schematic view of a functional film according to an embodiment.
Figure 2:
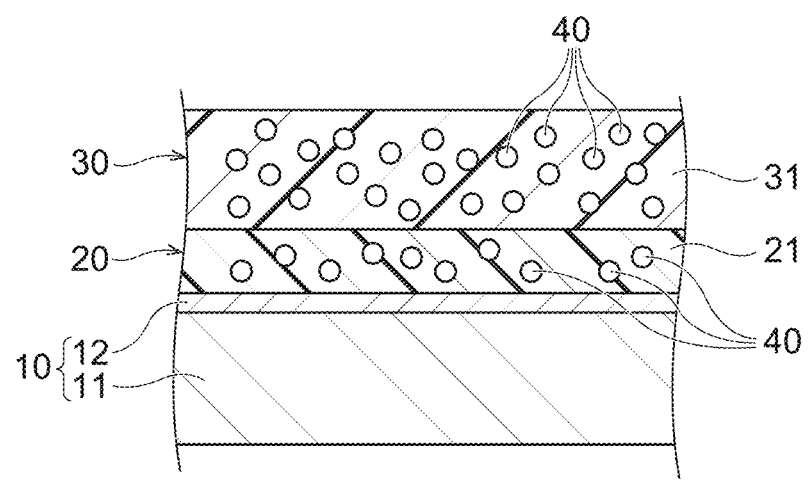
FIG. 2 is a schematic view of the cross section of the functional film according to the embodiment in the thickness direction.

First, a functional film 1 according to an embodiment will be described. FIG. 1 is a schematic view of the functional film 1 according to the embodiment. FIG. 2 is a schematic view of the cross section of the functional film 1 in the thickness direction.

As illustrated in FIG. 1 and FIG. 2, the functional film 1 includes a substrate 10, a primer layer 20 disposed on the substrate 10, and a functional layer 30 disposed on the primer layer 20.

To be more accurate, the primer layer 20 is in direct contact with one of a pair of surfaces of the substrate 10 that face each other in the thickness direction. The functional layer 30 is in direct contact with one of a pair of surfaces of the primer layer 20 that face each other in the thickness direction, the one surface being away from the substrate 10.

(Substrate)

The substrate 10 is a film member and has a pair of surfaces that face each other in the thickness direction. The substrate 10 may have, for example, visible light transmittance or may not have visible light transmittance. When the substrate 10 has visible light transmittance, a suitable value of visible light transmittance depends on the application of the functional film 1.

For example, when the functional film 1 is disposed on the display surface of a display, the substrate 10 is preferably colorless and transparent, and preferably has a total light transmittance of 87% or more, more preferably has a total light transmittance of 90% or more. When the functional film 1 is disposed on the display surface of a display, the refractive index of the substrate 10 may be 1.46 or more and 1.70 or less, 1.48 or more and 1.65 or less, 1.52 or more and 1.64 or less, 1.54 or more and 1.64 or less, or 1.56 or more and 1.64 or less. To control the anisotropy of light transmitted through the substrate 10 when the functional film 1 is disposed on the display surface of a display, the substrate 10 may be composed of a biaxially oriented film.

The substrate 10 may have ionizing radiation transmittance, such as ultraviolet radiation transmittance, or non-ionizing radiation transmittance. Because of the process for producing the functional film 1, the substrate 10 preferably has ionizing radiation transmittance or other properties in some cases. In such cases, ionizing radiation transmittance or other properties of the substrate 10 may be advantageous in producing the functional film 1. In this embodiment, the substrate 10 has both visible light transmittance and ultraviolet radiation transmittance. In application of food packages or other applications, the substrate 10 may have low visible light transmittance or may not have visible light transmittance.

The substrate 10 may be, for example, a film containing, as a main component, a synthetic resin, such as an acetyl cellulose resin, a polyester resin, a polyolefin resin, or an acrylic resin. The main component means, among multiple components constituting a certain substance, a component present at a proportion of 50% or more relative to the entire substance or a component present at the largest proportion. The substrate 10 may be, for example, a relatively hard plate member. However, a metal film may not be suitable as the substrate 10 because the metal film is significantly different from an organic resin in physical properties, such as thermal shrinkage rate and electrical conductivity.

Examples of the acetyl cellulose resin include triacetyl cellulose (TAC) and diacetyl cellulose. Of these resins, TAC is a material advantageous in ensuring high total light transmittance.

Examples of the polyester resin include polyethylene terephthalate (PET), polypropylene terephthalate (PEN), and polyethylene naphthalate. Examples of the polyolefin resin include polyethylene, polypropylene, and polymethylpentene. Examples of the acrylic resin include polymethyl methacrylate, polyethyl methacrylate, and polyethyl acrylate. The substrate 10 may be made of a material other than those described above.

The substrate 10 may have, but not limited to, a thickness of, for example, 10 μm or more and 200 μm or less. The lower limit of the thickness of the substrate 10 is preferably 15 μm or more, more preferably 25 μm or more in view of handling properties or other properties. The substrate 10 preferably has a thickness of 150 μm or less in view of reduction in film thickness.

As illustrated in FIG. 1 and FIG. 2, the substrate 10 includes a substrate main layer 11 and a permeation layer 12, and has the primer layer 20 on the permeation layer 12. The permeation layer 12 is formed by permeation of the resin contained in the primer layer 20 into part of the substrate 10 and located in a part of the substrate 10 that is adjacent to the primer layer 20.

As specifically described below, the primer layer 20 is formed from a diluted solution prepared by diluting a polymerizable resin composition with a solvent, and formed by, after applying the diluted solution, evaporating the solvent in the diluted solution and polymerizing the resin composition, namely, curing the resin composition. The application of the diluted solution first forms a base of the permeation layer 12 of the substrate 10. When the diluted solution is applied to the surface of the substrate 10, the solvent in the diluted solution permeates into the substrate 10 from the surface of the substrate 10 so that the substrate 10 swells. At this time, part of the resin composition in the diluted solution also permeates into the substrate 10 to form a base of the permeation layer 12. In this permeation state, the solvent evaporates and the resin composition part cures during formation of the primer layer 20, whereby the permeation layer 12 is formed.

To assuredly form the permeation layer 12, the solvent preferably easily permeates the substrate 10, and in this case, the substrate 10 preferably has relatively high water absorption (liquid absorption). Acetyl cellulose resins, particularly TAC, are synthetic resins having relatively high water absorption (liquid absorption) and generally have higher water absorption (liquid absorption) than PET and PC. To form the permeation layer 12, a TAC film containing TAC as a main component is therefore preferably used as the substrate 10. In this embodiment, the substrate 10 contains an acetyl cellulose resin and is specifically composed of a TAC film. When the substrate 10 is composed of a biaxially oriented film, the solvent tends to easily permeate the substrate 10, which is advantageous in forming the permeation layer 12. Therefore, the substrate 10 may be composed of a biaxially oriented film made of an acetyl cellulose resin. To form the permeation layer 12, the wettability of the substrate 10 may be 30 mN/m or more and 60 mN/m or less, or 40 mN/m or more and 50 mN/m or less, as measured in accordance with JIS K 6768: 1999. The substrate 10 with an excessive molecular weight may be undesirable in the formation of the permeation layer 12. From this point of view, the substrate 10 may have a weight-average molecular weight of 20,000 or more and 1,000,000 or less, or 25,000 or more and 800,000 or less. The weight-average molecular weight is measured by gel permeation chromatography (GPC) using a tetrahydrofuran solvent.

Figure 3A:
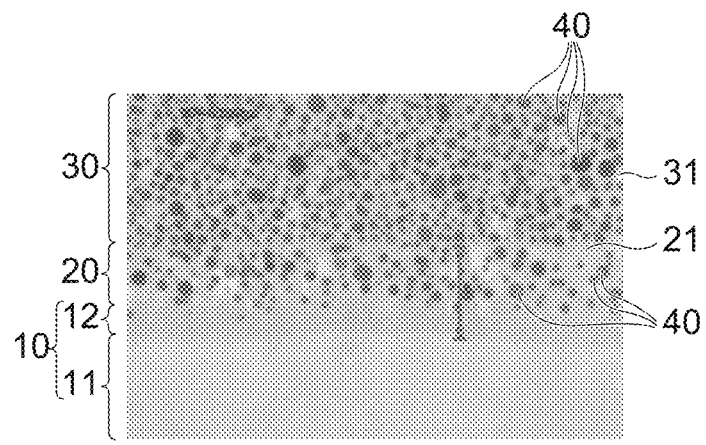
FIG. 3A illustrates the SEM image of the cross section of the functional film according to the embodiment in the thickness direction.

When the substrate 10 is a transparent substrate, there is a difference in color and/or haze between the substrate main layer 11 not permeated with the resin contained in the primer layer 20, and the permeation layer 12 permeated with the resin contained in the primer layer 20. FIG. 3A illustrates an example SEM image of the cross section of the functional film 1 in the thickness direction. Referring to FIG. 3A, the substrate 10 has the substrate main layer 11 and the permeation layer 12, and the permeation layer 12 has deeper color than the substrate main layer 11.

The presence of the permeation layer 12 on the substrate 10 may be confirmed by visually observing the SEM image of the layer cross section of the functional film 1 exposed by cutting the functional film 1 in the thickness direction as described above. The image captured with a transmission electron microscope (TEM) or a scanning transmission electron microscope (STEM) may be used for confirmation. The presence of the permeation layer 12 may be determined by examining, by component analysis, whether a resin that is a main component of the substrate 10 and the resin contained in the primer layer 20 are mixed in a part of the substrate 10 that is adjacent to the primer layer 20. The component analysis method in this case may be infrared spectroscopy, gas chromatography mass spectrometry, or other methods.

The permeation layer 12 is not necessarily formed on the substrate 10. However, the formation of the permeation layer 12 improves close contact between the substrate 10 and the primer layer 20. This results in improved close contact between the substrate 10 and the functional layer 30.

The permeation layer 12 preferably has a thickness of 0.1 µm or more and 3.5 µm or less. When the permeation layer 12 has a thickness of 0.1 µm or more, it is possible to ensure good close contact. The permeation layer 12 with an excessively large thickness is not preferred. For example, the permeation layer 12 preferably has a thickness of 3.5 µm or less in view of visible light transmittance.

(Primer Layer)

The primer layer 20 contains a resin 21, which is a polymer, for example, as a main component. More specifically, the primer layer 20 in the embodiment illustrated in FIG. 2 has the resin 21 and a countless filler 40 held by the resin 21. The primer layer 20 is located between these two members to bond the two members together and adheres to each of the two members. Adhesion means that two members in contact with each other are bonded together through at least one of the anchor effect, intermolecular attraction, and chemical bonding, such as covalent bonding. As described above, the primer layer 20 is in direct contact with one of a pair of surfaces of the substrate 10 that face each other in the thickness direction. The functional layer 30 is in direct contact with one of a pair of surfaces of the primer layer 20 that face each other in the thickness direction, the one surface being away from the substrate 10. Therefore, the primer layer 20 is located between the substrate 10 and the functional layer 30 and adheres to each of the substrate 10 and the functional layer 30.

As described below, the primer layer 20 is formed by applying, to the substrate 10, a diluted solution prepared by diluting a polymerizable resin composition with a solvent, and then evaporating the solvent and polymerizing the resin composition, namely, curing the resin composition. In other words, the primer layer 20 is formed so as to contain the resin 21, which is a polymer of the polymerizable resin composition, for example, as a main component. As specifically described below, the solvent evaporating step and the resin composition polymerizing (curing) step are carried out separately in this embodiment.

The resin 21 contained in the primer layer 20 in this embodiment is formed of, for example, a single resin when the filler 40 is excluded, in other words, formed by curing a single resin composition. However, the primer layer 20 may be formed by curing a mixture of two or more resin compositions. The term "polymerizable resin composition" in this embodiment refers to a resin composition containing a polymerizable resin material and, as desired, a polymerization initiator and an additive. In this embodiment, the resin composition further contains the filler 40.

The polymerization of the resin composition may be polymerization and/or crosslinking initiated by ionizing radiation or may be polymerization and/or crosslinking initiated by heating.

The polymerizable resin material contained in the resin composition for forming the primer layer 20 is at least one of polymerizable monomers, oligomers, and prepolymers.

The monomer polymerizable by ionizing radiation that may be used as the polymerizable resin material may be a monofunctional monomer or a polyfunctional monomer. The monofunctional monomer is, for example, a (meth)acrylate monomer. The polyfunctional monomer is, for example, a (meth)acrylate monomer having two or more polymerizable unsaturated bonds in the molecule (bifunctional or higher monomer), preferably having three or more polymerizable unsaturated bonds in the molecule (trifunctional or higher monomer). Specific examples of the polyfunctional (meth)acrylate include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalate neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, and caprolactone-modified dipentaerythritol hexa(meth)acrylate. These monomers may be used alone or in combination or two or more.

Examples of oligomers or prepolymers polymerizable by ionizing radiation that may be used as the polymerizable resin material include urethane (meth)acrylate, polyester (meth)acrylate, epoxy (meth)acrylate, melamine (meth)acrylate, polyfluoroalkyl (meth)acrylate, and silicone (meth)acrylate. These polymerizable oligomers or prepolymers may be used alone or in combination or two or more. When a layer is formed by polymerizing two or more monomers, oligomers, or prepolymers, it is understood that the resin component of the layer includes two or more resins (polymer components) in this description.

The polymerizable resin material contained in the resin composition may be a thermosetting resin. Examples of the thermosetting resin in this case include unsaturated polyester resins, polyurethane resins (including two-component curable polyurethane), epoxy resins, amino alkyd resins, phenolic resins, urea resins, diallyl phthalate resins, melamine resins, guanamine resins, melamine-urea cocondensation resins, silicone resins, and polysiloxane resins.

When the functional film 1 is disposed on the display surface of a display, the resin 21 contained in the primer layer 20 is transparent. The resin 21 preferably has high light transmittance. The resin 21 when the functional film 1 is disposed on the display surface of a display may have a refractive index of 1.40 or more and 1.55 or less. The resin 21 in this case may have a refractive index less than or equal to the refractive index of the substrate 10.

The permeation layer 12 in the substrate 10 is formed by permeation of the resin contained in the primer layer 20 into the substrate 10 as described above. In view of high light transmittance and ease in permeation of the resin into the substrate 10 during permeation before curing, the resin 21 contained in the primer layer 20 may be an acrylic resin, particularly pentaerythritol tri(meth)acrylate or dipentaerythritol hexa(meth)acrylate.

The primer layer 20 is not intended to allow the substrate 10 and the functional layer 30 to be peeled off or bonded to other members after bonding the substrate 10 and the functional layer 30 together. Therefore, the primer layer 20 does not have adhesiveness, such as heat-sensitive adhesiveness. From this point of view, the resin 21 contained in the primer layer 20 may be a polyurethane resin. The primer layer 20 in this embodiment contains no curing agent.

The resin 21 is formed in a film shape so as to cover the surface of the substrate 10 and holds the filler 40 inside. The filler 40 is appropriately selected according to the function of the functional film 1 and also contained in the functional layer 30 in this embodiment, similarly.

The filler 40 is, for example, inorganic particles, and is silica particles (silica particles) in this embodiment. The material of the filler 40 may be, for example, titanium oxide, glass beads, calcium carbonate, aluminum powder, mica, graphite, carbon black, or carbon fiber.

The use of inorganic particles as the filler 40 can, for example, increase the hardness of the entire functional film 1. A desired optical function may also be obtained. In some cases, inorganic particles are not preferred in view of close contact with the substrate 10, but in this embodiment, the formation of the permeation layer 12 as described above ensures close contact. The permeation layer 12 may contain the filler 40. The shape of the filler 40 is appropriately selected according to the function of the functional film 1 and is, for example, a spherical shape, a needle shape, or a plate shape.

In this embodiment, the filler 40 is silica particles and transparent, and the functional film 1 may thus have an optical function, such as transmission, refraction, or reflection when the functional film 1 entirely has light transmittance. When the functional film 1 is disposed on the display surface of a display, the filler 40 composed of silica particles may have a refractive index of 1.40 or more and 1.50 or less. The filler 40 composed of silica particles may have a refractive index smaller than the refractive index of the resin 21. In this case, in particular, a difference in refractive index between the resin 21 and the filler 40 composed of silica particles may be 0.01 or more and 0.05 or less.

The primer layer 20 preferably has a thickness of 0.1 μm or more and 1.0 μm or less. As described below, the filler 40 has an average particle size of, for example, 10 nm or more and 100 nm or less. In this case, good close contact can be ensured when the primer layer 20 has a thickness of 0.1 μm or more. With the primer layer 20 having an excessively small thickness, many particles of the filler 40 may be exposed from the resin 21 to outside, and the close contact tends to decrease. The primer layer 20 with an excessively large thickness is not preferred. For example, the primer layer 20 preferably has a thickness of 1.0 μm or less in view of visible light transmittance.

The size of the filler 40 is not limited and appropriately selected according to the function of the functional film 1. The filler 40 may have an average particle size of 10 nm or more and 100 nm or less. The average particle size of the filler 40 is preferably 20 nm or more and 80 nm or less, more preferably 35 nm or more and 65 nm or less. If the average particle size is less than 20 nm, the cost will be high. The filler 40 with a large size may cause poor optical properties, such as high haze. The average particle size of the filler 40 is measured by dynamic light scattering in accordance with JIS Z 8828:2019. The average particle size may be measured by using a dynamic light scattering particle size distribution analyzer (UPA 150) available from MicrotracBEL.

In this embodiment, the presence of the filler 40 increases the hardness of the primer layer 20. However, the primer layer 20 is not intended to be a typical hard coat layer. From this point of view, the primer layer 20 does not necessarily have a large thickness or high hardness. From this point of view, the thickness of the primer layer 20 may be 0.1 μm or more and 1.0 μm or less, less than 1.0 μm, or 0.9 μm or less. The pencil hardness of the primer layer 20 may be 3H or lower. In consideration of optical performance and the bonding strength between the substrate 10 and the primer layer 20, the amount of the filler 40 may be relatively small. For example, the proportion of the filler 40 in the entire primer layer 20 may be 5 mass % or more and 60 mass % or less, or 20 mass % or more and 45 mass % or less.

When the filler 40 has an average particle size of 20 nm or more and 80 nm or less, 15 particles or more and 45 particles or less of the filler 40 in the primer layer 20 may be present per 0.2 μm$^2$, 20 particles or more and 40 particles or less of the filler 40 in the primer layer 20 may be present per 0.2 μm$^2$, or 25 particles or more and 35 particles or less of the filler 40 in the primer layer 20 may be present per 0.2 μm$^2$ in the cross section of the primer layer 20 in the thickness direction.

To measure the number of particles of the filler 40 in the cross section described here, for example, the SEM image of the cross section of the functional film 1 in the thickness direction as illustrated in FIG. 3A is first obtained. Next, three areas of 0.2 μm$^2$ (0.796 (μm)×0.251 (μm)) are set in the primer layer 20 in the SEM image. The number of circular or substantially circular regions that can be identified as regions each occupying a single particle of the filler 40 is then counted in each of the three areas by using a predetermined function of image processing software (product name "Image J," available from the National Institutes of Health in USA), whereby the number of particles of the filler 40 is specified. The average number of particles in the three regions is defined as the number of particles of the filler 40 per 0.2 μm$^2$.

In other words, the number of particles of the filler 40 present in the cross section of the primer layer 20 in the thickness direction is the number of particles of the filler 40 measured by the image processing software, more specifically, the average number of particles in three partial regions, in the primer layer 20 in the enlarged image of the cross section of the functional film 1 in the thickness direction. The measurement of the number of particles will be described below in detail.

With regard to the structure where 15 particles or more and 45 particles or less of the filler 40 are present per 0.2 μm² in the cross section of the primer layer 20 in the thickness direction, there is a difference in characteristics between the case where 45 particles of the filler 40 having an average particle size of 80 nm are present and the case where 10 particles of the filler 40 having an average particle size of 10 nm are present. The inventors of the present invention have confirmed that good close contact may be ensured between the primer layer 20 and the substrate 10 when 45 particles of the filler 40 having an average particle size of 80 nm are present per 0.2 μm². The inventors of the present invention also have confirmed that the filler 40 may exhibit a predetermined function when 15 particles of the filler 40 having an average particle size of 10 nm are present per 0.2 μm².

(Functional Layer)

The functional layer 30 contains a resin 31, which is a polymer, for example, as a main component. More specifically, the functional layer 30 has the resin 31 and the countless filler 40 held by the resin 31 as illustrated in FIG. 2. In the functional layer 30 in this embodiment, the contained filler 40 exhibits a desired function expected for the functional film 1.

The function that may be exhibited by the functional layer 30 may be, for example, an optical function, such as anti-glare or anti-reflection, hard coat, gas barrier, ensuring conductivity, ensuring magnetism, abrasion resistance, heat insulation, flame retardancy, or UV blocking. This type of the functional layer 30 may exhibit a desired function without containing a filler.

In this embodiment, the primer layer 20 and the functional layer 30 contain the same resin. Specifically, the resin 21 contained in the primer layer 20 and the resin 31 contained in the functional layer 30 are the same, that is, composed of the same resin component. In other words, the resin 21 and the resin 31 are formed by curing the same polymerizable resin composition.

More specifically, the resin 31 contained in the functional layer 30 in this embodiment is formed of, for example, a single resin when the filler 40 is excluded, in other words, formed from a single resin composition. The single resin is the same as the single resin corresponding the resin 21 of the primer layer 20, and the single resin composition is the same as the single resin composition forming the primer layer 20. The functional layer 30 may be formed by curing a mixture of two or more resin compositions. In this case, the primer layer 20 is also preferably formed by curing a mixture of two or more resin compositions that are the same as in the functional layer 30. In this case, the efficiency of the production process is improved.

When the primer layer 20 contains two or more resins, and the functional layer 30 contains two or more resins, the bonding strength between the primer layer 20 and the functional layer 30 is high as long as at least one resin in the primer layer 20 is the same as at least one resin in the functional layer 30. The primer layer 20 and the functional layer 30 may have the following configuration.

When the primer layer 20 contains two or more resins, and the functional layer 30 contains two or more resins, part of the resin component of the primer layer 20 may have the same composition as part of the resin component of the functional layer 30, and the remainder of the resin component other than the above part in the primer layer 20 may be different from the reminder of the resin component other than the above part in the functional layer 30. The mixing ratio, in the resin component of the primer layer 20, of part of the resin component of the primer layer 20 may be different from the mixing ratio, in the functional layer 30, of part of the resin component of the functional layer 30.

The expression "part of the resin component of the primer layer 20 has the same composition as part of the resin component of the functional layer 30" means the following (i) or (ii).

(i) Part of the resin component of the primer layer 20 is composed of a single resin. Part of the resin component of the functional layer 30 is composed of a single resin that is the same as the single resin constituting part of the resin component of the primer layer 20.

(ii) Part of the resin component of the primer layer 20 is composed of two or more resins. Part of the resin component of the functional layer 30 is composed of two or more resins that are the same resins at the same mixing ratio as the two or more resins constituting part of the resin component of the primer layer 20. The mixing ratio of two or more resins in this case means the blending ratio (blending ratio of two or more resins) in part of the resin component.

The expression "the remainder of the resin component other than the above part in the primer layer 20 is different from the reminder of the resin component other than the above part in the functional layer 30" means (a) when both of the remainders are composed of a single resin, the remainders are composed of different single resins; (b) when both of the remainders are composed of two or more resins, at least one of the two or more resins is different between the remainders; or (c) when both of the remainders are composed of two or more resins, all of the resins are the same in both of the remainders, but the mixing ratio of two or more resins is different between the remainders of the resin components.

When part of the resin component of the primer layer 20 is the same as part of the resin component of the functional layer 30 as described above, the part of the resin component of the primer layer 20 is preferably 50 parts by mass or more and less than 100 parts by mass relative to 100 parts by mass of the resin component of the primer layer 20, and the part of the resin component of the functional layer 30 is preferably 50 parts by mass or more and less than 100 parts by mass relative to 100 parts by mass of the resin component of the functional layer 30. The part of the resin component of the primer layer 20 or the functional layer 30 may be 60 parts by mass or more and less than 100 parts by mass relative to 100 parts by mass of the corresponding resin component, 70 parts by mass or more and less than 100 parts by mass relative to 100 parts by mass, 80 parts by mass or more and less than 100 parts by mass relative to 100 parts by mass, or 90 parts by mass or more and less than 100 parts by mass relative to 100 parts by mass. This configuration may sufficiently increase the bonding strength between the primer layer 20 and the functional layer 30.

When the primer layer 20 contains two or more resins, and the functional layer 30 contains two or more resins, part of the resin component of the primer layer 20 has the same composition as part of the resin component of the functional layer 30, and the remainder of the resin component other than the above part in the primer layer 20 has the same composition as the reminder of the resin component other than the above part in the functional layer 30, but the mixing ratio of the part and the remainder of the resin component of the primer layer 20 may be different from that of the part and the reminder of the resin component of the functional layer 30.

The expression "part (remainder) of the resin component of the primer layer 20 has the same composition as part (remainder) of the resin component of the functional layer 30" means the following (iii) or (iv).

(iii) Part (remainder) of the resin component of the primer layer 20 is composed of a single resin. Part (remainder) of the resin component of the functional layer 30 is composed of a single resin that is the same as the single resin constituting part (remainder) of the resin component of the primer layer 20.

(iv) Part (remainder) of the resin component of the primer layer 20 is composed of two or more resins. Part (remainder) of the resin component of the functional layer 30 is composed of two or more resins that are the same resins at the same mixing ratio as the two or more resins constituting part (remainder) of the resin component of the primer layer 20. The mixing ratio of two or more resins in this case means the blending ratio (blending ratio of two or more resins) in part (remainder) of the resin component.

When the resin 21 contained in the primer layer 20 is the same as the resin 31 contained in the functional layer 30 as in the embodiment, the resin 21 and the resin 31 have the same type of interface and may partially or entirely fuse with each other, that is, may form chemical bonding, and furthermore have the same or substantially the same coefficient of linear expansion to improve close contact between the primer layer 20 and the functional layer 30. Whether the resin 21 contained in the primer layer 20 is the same as the resin 31 contained in the functional layer 30 may be examined by component analysis, specifically, may be examined by infrared spectroscopy or gas chromatography-mass spectrometry.

In this embodiment, the resin 21 contained in the primer layer 20 is the same as the resin 31 contained in the functional layer 30, but the process for forming the functional layer 30 is different from the process for forming the primer layer 20. More specifically, the functional layer 30 is formed by directly curing the resin composition itself without diluting the resin composition with a solvent. In this case, the resin composition used to form the functional layer 30 is the same as the polymerizable resin composition for forming the primer layer 20 in this embodiment.

Since the polymerizable resin composition for forming the functional layer 30 is the same as the polymerizable resin composition for forming the primer layer 20, the polymerizable resin composition for forming the functional layer 30 may contain a polymerization initiator and at least one of polymerizable monomers, oligomers, and prepolymers, or may contain a polymerization initiator, an additive, and at least one of polymerizable monomers, oligomers, and prepolymers. In this embodiment, the resin composition for forming the functional layer 30 also contains the filler 40. The additive may be a leveling agent. When the polymerizable resin composition for forming the primer layer 20 contains a polymerization initiator and/or an additive, the resin composition for forming the functional layer 30 preferably contains the same polymerization initiator and/or the same additive as in the polymerizable resin composition for forming the primer layer 20. In this case, the primer layer 20 and the functional layer 30 after curing may contain the same polymerization initiator and/or the same additive.

The monomer polymerizable by ionizing radiation that may be used as the polymerizable resin material contained in the resin composition may be a monofunctional monomer or a polyfunctional monomer. Substances that may be used as monofunctional monomers, polyfunctional monomers, oligomers, and prepolymers are the same as illustrated in the description of the primer layer 20.

When the functional film 1 is disposed on the display surface of a display, the resin 31 contained in the functional layer 30 is transparent. The resin 31 preferably has high light transmittance. The resin 31 when the functional film 1 is disposed on the display surface of a display may have a refractive index of 1.40 or more and 1.55 or less because the resin 21 contained in the primer layer 20 is the same as the resin 31 contained in the functional layer 30 in this embodiment.

In this embodiment, the filler 40 contained in the functional layer 30 is also the same as the filler 40 contained in the primer layer 20. In this embodiment, the filler 40 contained in the primer layer 20 is the same as the filler 40 contained in the functional layer 30, but the primer layer 20 and the functional layer 30 may contain different fillers. In this case, the function of the functional film can be expanded.

Referring to FIG. 2 and FIG. 3A, the filler 40 in the primer layer 20 has a lower density than the filler 40 in the functional layer 30 in this embodiment. In this case, the close contact between the substrate 10 and the primer layer 20 may be improved because less particles of the filler 40 in the primer layer 20 are in contact with the substrate 10. In addition, the close contact between the primer layer 20 and the functional layer 30 may be improved because there is a large contact area between the resin 21 and the resin 31, which are composed of the same component, in the primer layer 20 and the functional layer 30.

The density of the filler 40 is measured by using a scanning electron microscope (SEM), a transmission electron microscope (TEM), or a scanning transmission electron microscope (STEM) and using image processing software.

More specifically, the image of the cross section of the functional film 1 captured at a resolution of 150 dpi and a magnification of 50,000× by using a scanning electron microscope (SEM), a transmission electron microscope (TEM), or a scanning transmission electron microscope (STEM) is read by using image processing software (product name "Image J," available from the National Institutes of Health in USA) and binarized into black and white. More specifically, the following steps (1) to (4) are carried out.

(1) The number of pixels of the loaded image is adjusted to 640×480 pixels.

(2) The actual scale is set on the image having the number of pixels adjusted.

(3) If the image is not an 8-bit grayscale image, the image is converted to an 8-bit grayscale image. The grayscale image is then binarized into a black-and-white image by selecting "IJ_ISODATA" and "B & W" in automatic binarization. The overlapping particles are then separated by "Watershed."

(4) The area ratio of the filler is then specified by automatic analysis using "Analize Partcles." The area ratio of the filler corresponds to the density of the filler.

Figure 3B:
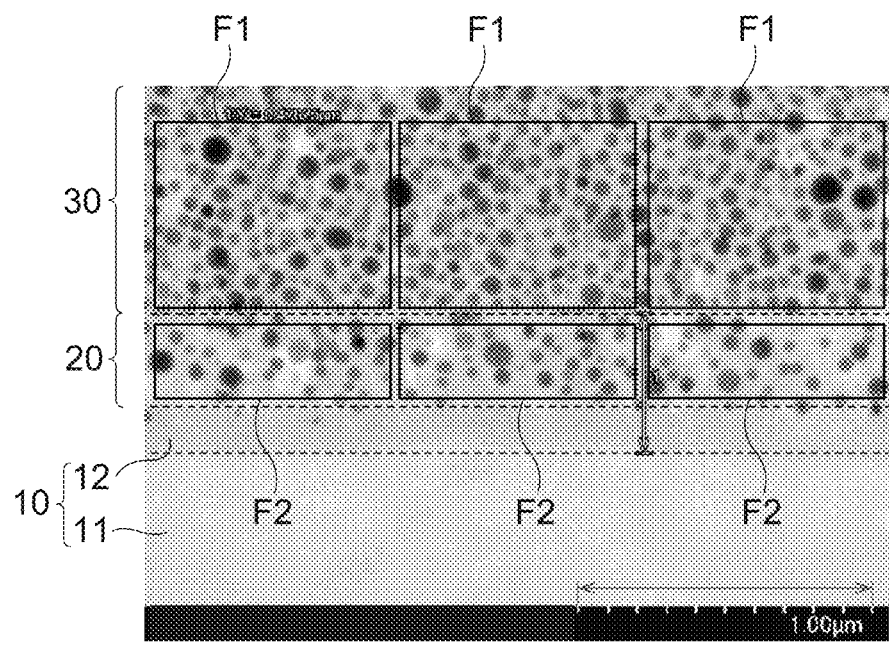
FIG. 3B illustrates the process for measuring the density and number of particles of a filler in the cross section of the functional film illustrated in FIG. 3A in the thickness direction.

FIG. 3B illustrates the process for measuring the density of the filler 40 in the cross section of the SEM image illustrated in FIG. 3A.

More specifically, the density of the functional layer 30 is measured by selecting three areas (first frames F1) of 0.5 µm² (0.796 (µm)×0.628 (µm)) illustrated in FIG. 3B from the functional layer 30 in the image after the step (3) and subjecting each of the three areas to the automatic analysis. The average density in three areas is specified as the density of the filler 40 in the functional layer 30.

The density of the primer layer 20 is measured by selecting three areas (second frames F2) of 0.2 µm² (0.796 (µm)×0.251 (µm)) illustrated in FIG. 3B from the primer layer 20 in the image after the step (3) and subjecting each of the three areas to the automatic analysis. The average density in three areas is specified as the density of the filler 40 in the primer layer 20. In "Analize Partcles", the size (item: Size) of a portion recognized as the filler is set to 0.0001 to 0.10 (µm²). The circularity of the portion recognized as the filler is set to 0.50 to 1.0.

The frames (F1, F2) illustrated in FIG. 3B may have any dimensional ratio. For example, when the primer layer 20 has a thickness of 0.1 µm, an area of 0.1 µm long×2 µm wide may be defined as the second frame F2.

The density of the filler 40 in the primer layer 20 specified in the above steps may be 5% or more and 50% or less. The density of the filler 40 in the primer layer 20 may be 15% or more and 30% or less, particularly preferably 17.5% or more and 22.5% or less. With a density of 15% or more and 30% or less, the filler 40 contributes to the function of the functional layer 30 and improves close contact between the substrate 10 and the primer layer 20 and close contact between the primer layer 20 and the functional layer 30. In particular, the filler 40 with a density of 17.5% or more and 22.5% or less assuredly improves the close contact. The density of the filler 40 in the functional layer 30 specified in the above steps may be 15% or more and 90% or less. The density of the filler 40 in the functional layer 30 is appropriately selected according to an expected function. To ensure the function and ensure good close contact between the functional layer 30 and the primer layer 20, the density of the filler 40 in the functional layer 30 may be 30% or more and 60% or less, 37.5% or more and 50% or less, or 37.5% or more and 45% or less.

The density of the filler 40 in the primer layer 20 may be ⅓ or more and ¾ or less of the density of the filler 40 in the functional layer 30, ½ or more and ¾ or less of the density of the filler 40 in the functional layer 30, or ⅓ or more and ½ or less of the density of the filler 40 in the functional layer 30. The filler 40 in the primer layer 20 may have the same density as the filler 40 in the functional layer 30.

In this embodiment, the filler 40 is silica particles, and the functional film 1 may have an optical function, such as transmission, refraction, or reflection when the functional film 1 entirely has light transmittance. As described above, the filler 40 in the primer layer 20 has a lower density than the filler 40 in the functional layer 30. If the silica particles have a lower refractive index than the resins 21 and 31 in this case, the entire primer layer 20 has a larger refractive index than the entire functional layer 30. When the density of the filler 40 in the primer layer 20 is ⅓ or more and ¾ or less of the density of the filler 40 in the functional layer 30, it is easy to form a layer structure where the refractive index evenly decreases in the order of the substrate 10, the primer layer 20, and the functional layer 30. To form this layer structure, the substrate 10 preferably has a refractive index of 1.46 or more. The "evenly decrease" means that the refractive index decreases in the order of the substrate 10, the primer layer 20, and the functional layer 30 while a difference in refractive index between the substrate 10 and the primer layer 20 and a difference in refractive index between the primer layer 20 and the functional layer 30 are relatively small. The "relatively small" means, for example, 0.05 or less. Such a structure easily transmits light.

In this embodiment, the presence of the filler 40 increases the hardness of the functional layer 30. The functional layer 30 may be expected to have a certain degree of hardness. From this point of view, the thickness of the functional layer 30 may be 2 times or more and 100 times or less of the thickness of the primer layer 20, or 5 times or more and 50 times or less of the thickness of the primer layer 20, or 10 times or more and 30 times or less of the thickness of the primer layer 20. The thickness of the functional layer 30 may be 2 µm or more and 10 µm or less, 4 µm or more and 8 µm or less, or 5 µm or more and 7 µm or less. The pencil hardness of the functional layer 30 may be 3H or higher, preferably 4H or higher. The proportion of the filler 40 in the entire functional layer 30 may be 10 mass % or more and 60 mass % or less, or 15 mass % or more and 40 mass % or less, or 25 mass % or more and 35 mass % or less.

When the filler 40 has an average particle size of 20 nm or more and 80 nm or less, 90 particles or more and 150 particles or less of the filler 40 in the functional layer 30 may be present per 0.5 µm², 110 particles or more and 140 particles or less of the filler 40 in the functional layer 30 may be present per 0.5 µm², or 115 particles or more and 135 particles or less of the filler 40 in the functional layer 30 may be present per 0.5 µm² in the cross section of the functional layer 30 in the thickness direction.

To measure the number of particles of the filler 40 in the cross section described here, for example, the SEM image of the cross section of the functional film 1 in the thickness direction as illustrated in FIG. 3A is first obtained as in the case of the filler 40 in the primer layer 20. Next, three areas of 0.5 µm² (0.796 (µm)×0.628 (µm)) are set in the functional layer 30 in the SEM image. The number of circular or substantially circular regions that can be identified as regions each occupying a single particle of the filler 40 is then counted in each of the three ranges by using a predetermined function of image processing software (product name "Image J," available from the National Institutes of Health in USA), whereby the number of particles of the filler 40 is specified. The average number of particles in the three regions is defined as the number of particles of the filler 40 per 0.5 µm². This process will be described below.

Specifically, the number of particles of the filler 40 is measured by using a scanning electron microscope (SEM), a transmission electron microscope (TEM), or a scanning transmission electron microscope (STEM) and using image processing software.

More specifically, the image of the cross section of the functional film 1 captured at a resolution of 150 dpi and a magnification of 50,000× by using a scanning electron microscope (SEM), a transmission electron microscope (TEM), or a scanning transmission electron microscope (STEM) is read by using image processing software (product name "Image J," available from the National Institutes of Health in USA) and binarized into black and white. More specifically, the following steps (1) to (4) are carried out.

(1) The number of pixels of the loaded image is adjusted to 640×480 pixels.
(2) The actual scale is set on the image having the number of pixels adjusted.
(3) If the image is not an 8-bit grayscale image, the image is converted to an 8-bit grayscale image. The grayscale image is then binarized into a black-and-white image by selecting "IJ_ISODATA" and "B & W" in automatic binarization. The overlapping particles are then separated by "Watershed."

(4) The number of particles of the filler is then specified by automatic analysis using "Analize Partcles."

More specifically, the number of particles of the filler 40 in the functional layer 30 is measured by selecting three areas (first frames F1) of 0.5 μm² (0.796 (μm)×0.628 (μm)) illustrated in FIG. 3B from the functional layer 30 in the image after the step (3) and subjecting each of the three areas to the automatic analysis. The average number in three areas is specified as the number of particles of the filler 40 in the functional layer 30.

The number of particles of the filler 40 in the primer layer 20 is measured by selecting three areas (second frames F2) of 0.2 μm² (0.796 (μm)×0.251 (μm)) illustrated in FIG. 3B from the primer layer 20 in the image after the step (3) and subjecting each of the three areas to the automatic analysis. The average number in three areas is specified as the number of particles of the filler 40 in the primer layer 20.

In "Analize Partcles", the size (item: Size) of a portion recognized as the filler is set to 0.0001 to 0.10 (μm²). The circularity of the portion recognized as the filler is set to 0.50 to 1.0.

As described above, the frames (F1, F2) may have any dimensional ratio. For example, when the primer layer 20 has a thickness of 0.1 μm, an area of 0.1 μm long×2 μm wide may be defined as the second frame F2.

In FIG. 3B, the number of particles of the filler 40 in the first frame F1 on the left side was 114. The number of particles of the filler 40 in the first frame F1 at the center was 114. The number of particles of the filler 40 in the first frame F1 on the right side was 106. The average number of particles in three areas was 111, which was specified as the number of particles of the filler 40 per 0.5 μm² in the functional layer 30.

The number of particles of the filler 40 in the second frame F2 on the left side was 33. The number of particles of the filler 40 in the second frame F2 at the center was 31. The number of particles of the filler 40 in the second frame F2 on the right side was 27. The average number of particles in three areas was 30, which was specified as the number of particles of the filler 40 per 0.2 μm² in the primer layer 20.

The results of the area ratio (density) of the filler in each of the frames F1 and F2 in FIG. 3B specified by the automatic analysis are as described below.

The density of the filler 40 in the first frame F1 on the left side was 41.8%. The density of the filler 40 in the first frame F1 at the center was 40.5%. The density of the filler 40 in the first frame F1 on the right side was 39.4%. The average density in three areas was 40.6%, which was specified as the density of the filler 40 per 0.5 μm² in the functional layer 30. The density of the filler 40 in the second frame F2 on the left side was 26.0%. The density of the filler 40 in the second frame F2 at the center was 24.0%. The density of the filler 40 in the second frame F2 on the right side was 20.8%. The average density in three areas was 23.6%, which was specified as the density of the filler 40 per 0.2 μm² in the primer layer 20.

Figure 4A:
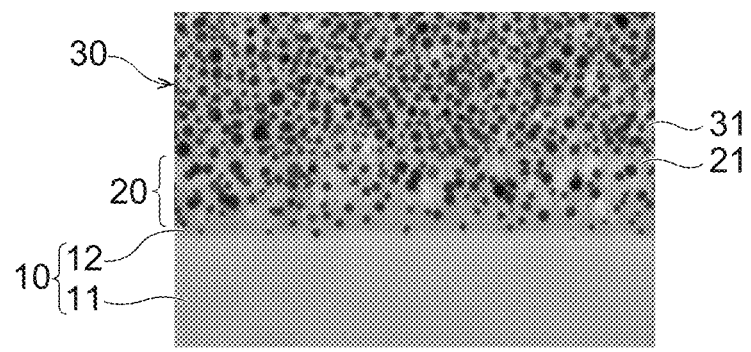
FIG. 4A illustrates the SEM image of the cross section of a functional film according to one modification in the thickness direction.
Figure 5A:
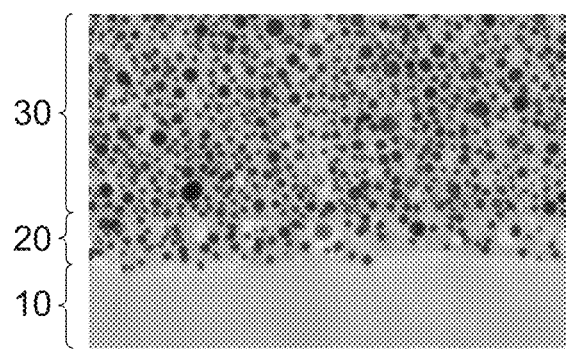
FIG. 5A illustrates the SEM image of the cross section of a functional film according to another modification in the thickness direction.

FIG. 4A and FIG. 5A illustrate the SEM images of the cross sections of functional films according to modifications in the thickness direction. A permeation layer 12 in FIG. 4A is thinner than the permeation layer 12 in FIG. 3A. In FIG. 5A, there is no permeation layer 12.

Figure 4B:
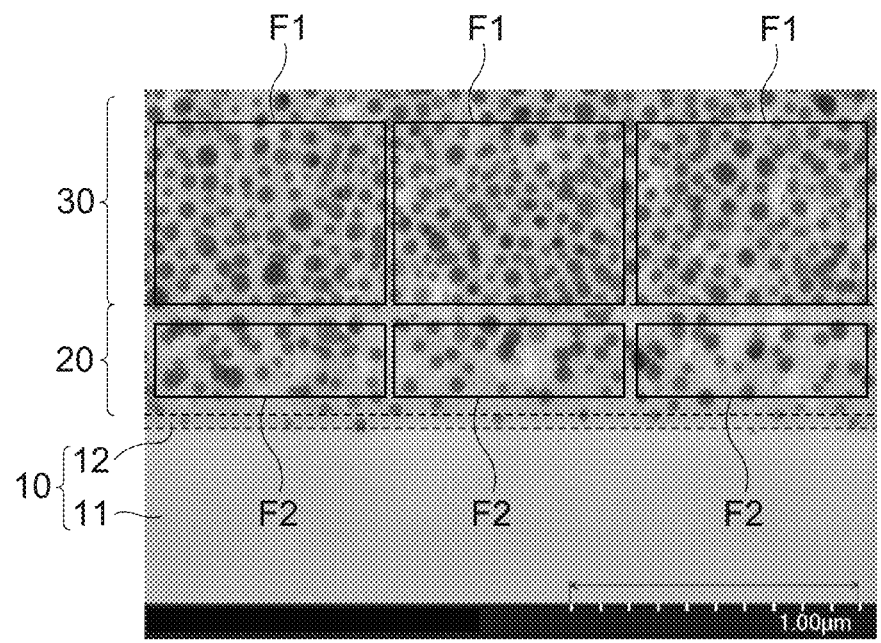
FIG. 4B illustrates the process for measuring the density and number of particles of the filler in the cross section of the functional film according to the modification illustrated in FIG. 4A in the thickness direction.
Figure 5B:
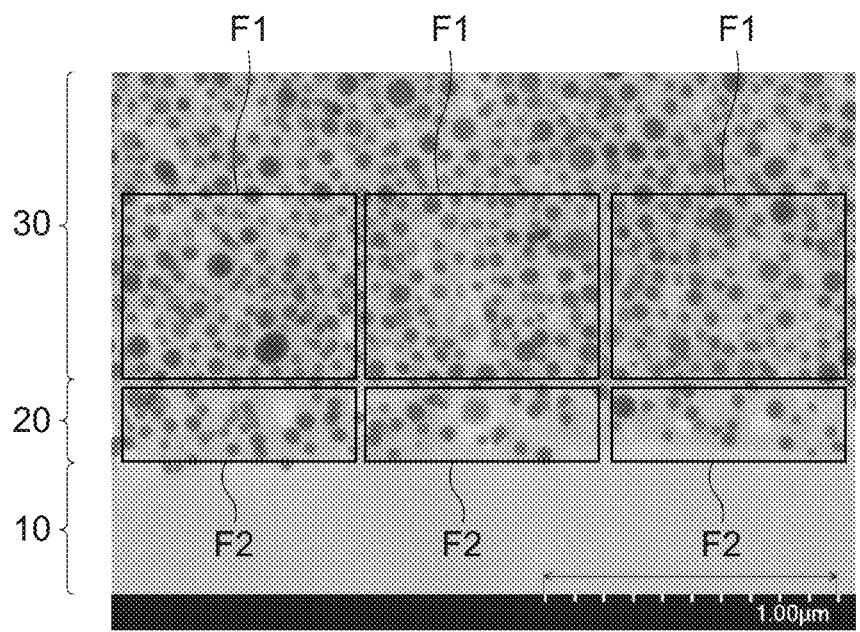
FIG. 5B illustrates the process for measuring the density and number of particles of the filler in the cross section of the functional film according to the modification illustrated in FIG. 5A in the thickness direction.

FIG. 4B illustrates the process for measuring the number of particles of the filler 40 in the cross section of the SEM image illustrated in FIG. 4A. FIG. 5B illustrates the process for measuring the number of particles of the filler 40 in the cross section of the SEM image illustrated in FIG. 5A. FIG. 4B and FIG. 5B each illustrate three first frames F1 and three second frames F2. The results of the number of particles of the filler 40 and the density of the filler 40 determined from the images in FIG. 4B and FIG. 5B are as described below.

In FIG. 4B, the number of particles of the filler 40 in the first frame F1 on the left side was 101. The number of particles of the filler 40 in the first frame F1 at the center was 109. The number of particles of the filler 40 in the first frame F1 on the right side was 103. The average number of particles in three areas was 104, which was specified as the number of particles of the filler 40 shown per 0.5 μm² in the functional layer 30.

The number of particles of the filler 40 in the second frame F2 on the left side was 29. The number of particles of the filler 40 in the second frame F2 at the center was 27. The number of particles of the filler 40 in the second frame F2 on the right side was 25. The average number of particles in three areas was 27, which was specified as the number of particles of the filler 40 shown per 0.2 μm² in the primer layer 20.

The density of the filler 40 in the first frame F1 on the left side in FIG. 4B was 40.4%. The density of the filler 40 in the first frame F1 at the center was 41.9%. The density of the filler 40 in the first frame F1 on the right side was 38.9%. The average density in three areas was 40.4%, which was specified as the density of the filler 40 per 0.5 μm² in the functional layer 30.

The density of the filler 40 in the second frame F2 on the left side in FIG. 4B was 33.4%. The density of the filler 40 in the second frame F2 at the center was 26.4%. The density of the filler 40 in the second frame F2 on the right side was 25.5%. The average density in three areas was 28.4%, which was specified as the density of the filler 40 per 0.2 μm² in the primer layer 20.

In FIG. 5B, the number of particles of the filler 40 in the first frame F1 on the left side was 111. The number of particles of the filler 40 in the first frame F1 at the center was 95. The number of particles of the filler 40 in the first frame F1 on the right side was 96. The average number of particles in three areas was 101, which was specified as the number of particles of the filler 40 shown per 0.5 μm² in the functional layer 30.

The number of particles of the filler 40 in the second frame F2 on the left side was 31. The number of particles of the filler 40 in the second frame F2 at the center was 22. The number of particles of the filler 40 in the second frame F2 on the right side was 21. The average number of particles in three areas was 25, which was specified as the number of particles of the filler 40 shown per 0.2 μm² in the primer layer 20.

The density of the filler 40 in the first frame F1 on the left side in FIG. 5B was 36.5%. The density of the filler 40 in the first frame F1 at the center was 33.7%. The density of the filler 40 in the first frame F1 on the right side was 35.3%. The average density in three areas was 35.2%, which was specified as the density of the filler 40 per 0.5 μm² in the functional layer 30.

The density of the filler 40 in the second frame F2 on the left side in FIG. 5B was 26.0%. The density of the filler 40 in the second frame F2 at the center was 19.6%. The density of the filler 40 in the second frame F2 on the right side was 15.7%. The average density in three areas was 20.4%, which was specified as the density of the filler 40 per 0.2 μm² in the primer layer 20.

The results of the number of particles of the filler 40 and the density of the filler 40 determined from FIG. 3B, FIG. 4B, and FIG. 5B are shown below in Table 1.

TABLE 1

|  |  | FUNCTIONAL LAYER | | | | PRIMER LAYER | | | | PRIMER LAYER AVERAGE FUNCTIONAL LAYER AVERAGE |
| --- | --- | --- | --- | --- | --- | --- | --- | --- | --- | --- |
|  |  | LEFT FRAME | CENTRAL FRAME | RIGHT FRAME | AVERAGE | LEFT FRAME | CENTRAL FRAME | RIGHT FRAME | AVERAGE |  |
| NUMBER OF PARTICLES OF FILLER | FIG. 3B | 114 | 114 | 106 | 111 | 33 | 31 | 27 | 30 | 0.27 |
|  | FIG. 4B | 101 | 109 | 103 | 104 | 29 | 27 | 25 | 27 | 0.26 |
|  | FIG. 5B | 111 | 95 | 96 | 101 | 31 | 22 | 21 | 25 | 0.25 |
| DENSITY OF FILLER (%) | FIG. 3B | 41.8 | 40.5 | 39.4 | 40.6 | 26.0 | 24.0 | 20.8 | 23.6 | 0.58 |
|  | FIG. 4B | 40.4 | 41.9 | 38.9 | 40.4 | 33.4 | 26.4 | 25.5 | 28.4 | 0.70 |
|  | FIG. 5B | 36.5 | 33.7 | 35.3 | 35.2 | 26.0 | 19.6 | 15.7 | 20.4 | 0.58 |

Table 1 shows that the values obtained by dividing the average number of particles/average density of the filler 40 in the primer layer 20 by the average number of particles/average density of the filler 40 in the functional layer 30. The average number of particles of the filler 40 in the primer layer 20/the average number of particles of the filler 40 in the functional layer 30 was 0.27, 0.26, and 0.25 on the left, at the center, and on the right. In other words, the number of particles of the filler 40 in the primer layer 20 is around ¼ of the number of particles of the filler 40 in the functional layer 30. The functional layers 30 in the functional films in FIG. 3B3, FIG. 4B3, and FIG. 5B each showed good close contact. This result suggests that the functional layer 30 shows good close contact when the number of particles of the filler 40 in the primer layer 20 is ⅕ or more and ⅓ or less of the number of particles of the filler 40 in the functional layer 30.

The average density of the filler 40 in the primer layer 20/the average density of the filler 40 in the functional layer 30 was 0.58, 0.70, and 0.58 on the left, at the center, and on the right. In other words, the density of the filler 40 in the primer layer 20 is around ½ to ¾ of the number of particles of the filler 40 in the functional layer 30. This result suggests that the functional layer 30 shows good close contact when the density of the filler 40 in the primer layer 20 is ½ or more and ¾ or less of the density of the filler 40 in the functional layer 30. The inventors of the present invention also have confirmed that good close contact is obtained when the density of the filler 40 in the primer layer 20 is ⅓ or more of the density of the filler 40 in the functional layer 30.

<Method for Producing Functional Film>

Next, an example method for producing the functional film 1 will be described.

Figure 6:
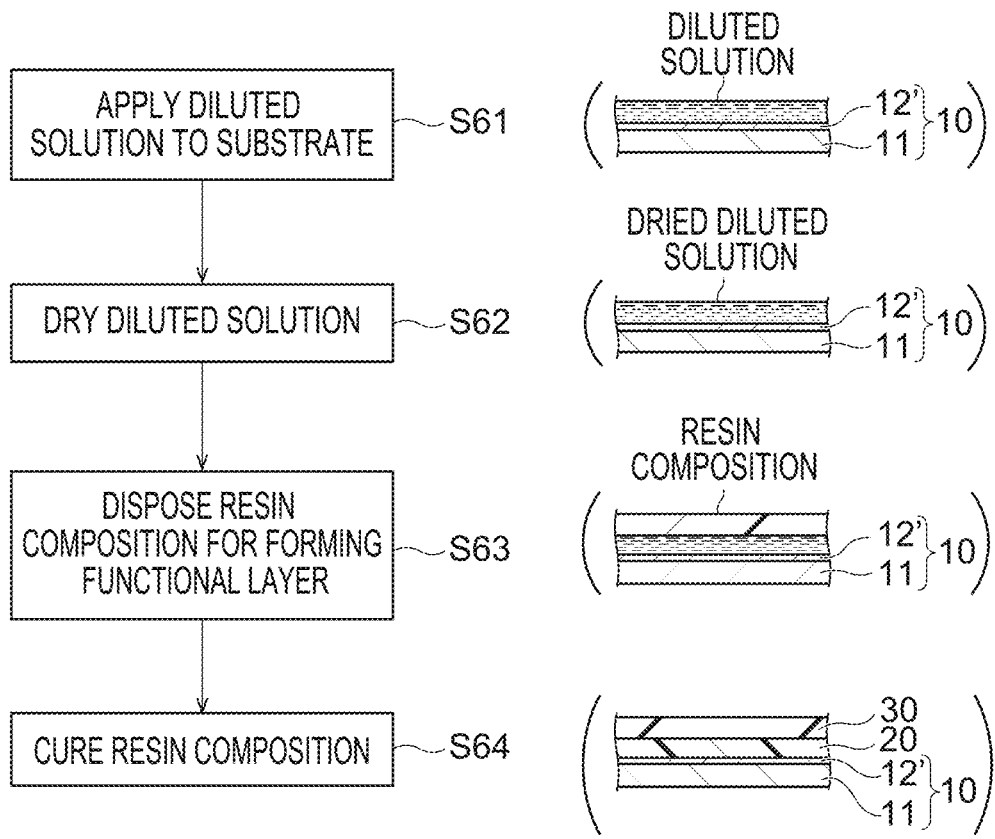
FIG. 6 is a flowchart of a method for producing a functional film according to an embodiment.
Figure 7:
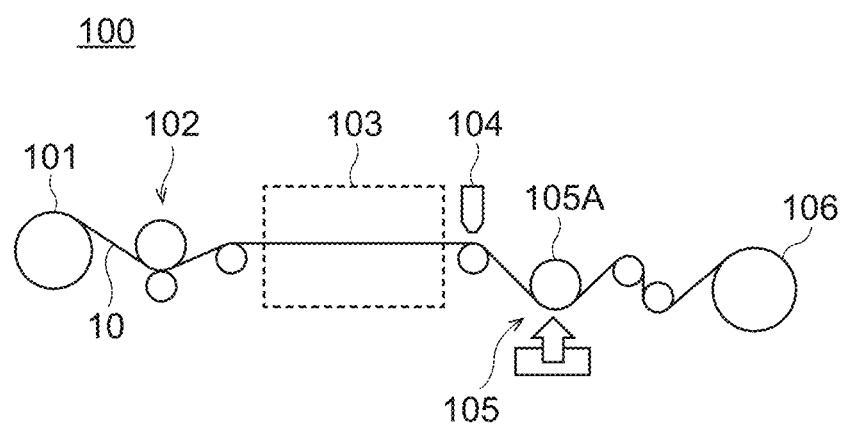
FIG. 7 illustrates production equipment for carrying out the method for producing a functional film according to the embodiment.

FIG. 6 is a flowchart of a method for producing the functional film 1. FIG. 7 illustrates an example of production equipment 100 for carrying out the method for producing the functional film 1 described in FIG. 6.

In the method for producing the functional film 1 illustrated in FIG. 6, a diluted solution applying step (S61), a drying step (S62), a disposing step (S63), and a curing step (S64) are performed in this order. FIG. 6 includes schematic views of the substrate 10 and the layers formed on the substrate 10 corresponding to the respective steps. Each step will be described below in detail.

(Diluted Solution Applying Step)

In the diluted solution applying step in Step S61, a diluted solution prepared by diluting a resin composition with a solvent is applied to the substrate 10. The diluted solution may be applied by, for example, using a gravure roll or a dip coater. In this embodiment, the resin composition is a polymerizable resin composition as described above, such as a resin composition containing an ionizing radiation-curable resin material, more specifically, a UV-curable resin material. The resin composition also contains the filler 40.

The solvent is composed of, for example, one or more ketone solvents, such as acetone, methyl ethyl ketone (MEK), and methyl isobutyl ketone (MIBK), and may be a solvent mixture of MEK and MIBK. In 100 parts by mass of the diluted solution, the solvent is, for example, 40 parts by mass or more and 99 part by mass or less, and the resin composition is 1 part by mass or more and 60 parts by mass or less. The remainder other than the solvent in the diluted solution is the resin composition.

In this embodiment, upon application of the diluted solution to the surface of the substrate 10 as described above, the solvent in the diluted solution permeates into the substrate 10 from the surface of the substrate 10 so that the substrate 10 swells, and the resin composition in the diluted solution also permeates the substrate 10 at the same time (12'). Subsequently, the solvent is evaporated in the drying step (S62), and the resin composition part is cured in the curing step (S64) to form the permeation layer 12.

To assuredly form the permeation layer 12, the solvent preferably easily permeates the substrate 10 containing the resin as a main component, and the solvent preferably has a high resin dissolving ability. Polar solvents, such as alcohol solvents, ketone solvents, ether solvents, ester solvents, and chlorinated solvents, are preferably used to form the permeation layer 12 because polar solvents commonly have a high resin dissolving ability. In particular, ketone solvents and ester solvents are preferably used to form the permeation layer 12. Non-polar solvents, such as hydrocarbon solvents, may be used as the solvent.

The primer layer 20 preferably has a thickness of 0.1 μm or more and 1.0 μm or less as described above, and the diluted solution applied on the substrate 10 preferably has a thickness of 3 μm or more and 30 μm or less in consideration of drying, condensation, polymerization, and other factors.

(Drying Step)

In the drying step in Step S62, the diluted solution on the substrate 10 is dried to evaporate part or the whole of the solvent in the diluted solution, and the resin composition in the diluted solution is left uncured or semi-cured. The diluted solution may be dried by passing the substrate 10 through a drying furnace 103 having a heater or by natural drying. To semi-cure the resin composition, a UV irradiation step (semi-curing step) may be performed in the drying step, or a UV irradiation step (semi-curing step) may be performed before the drying step. Since drying refers to "evaporating part or the whole of the solvent in the diluted solution" as described above, drying means evaporating part of a liquid component or evaporating the whole of a liquid component.

In this embodiment, part of the solvent is evaporated, and the residual solvent is intentionally left in the diluted solution. The resin composition in the diluted solution is uncured. In this embodiment, the functional film 1 in which the filler 40 in the primer layer 20 has a lower density than the filler 40 in the functional layer 30 is produced. When the residual solvent is left in the diluted solution, and the resin composition is uncured in this case, the filler 40 in the primer layer 20 tends to have a lower density than the filler 40 in the functional layer 30. This is the reason why the residual solvent is left and the resin composition is uncured.

Even if part of the solvent is evaporated, and the resin composition is semi-cured, or even if the whole of the solvent is evaporated, and the resin composition is uncured, the filler 40 in the primer layer 20 may have a lower density than the filler 40 in the functional layer 30. To realize this configuration by a simple method, the amount of the filler in the diluted solution is reduced. To make the density of the filler 40 in the primer layer 20 equal to the density of the filler 40 in the functional layer 30, the whole of the solvent may be evaporated, and the resin composition may be semi-cured.

(Disposing Step)

In the disposing step in Step S63, a resin composition for forming the functional layer 30 is disposed on the diluted solution after the drying step. The resin composition may be disposed by any method, and may be applied from a die head. The diluted solution after the drying step has viscosity in this embodiment because at least part of the solvent is evaporated.

In this embodiment, the resin composition used in the disposing step is the same substance as the resin composition diluted with the solvent in the diluted solution applying step. In this embodiment, the heated resin composition is disposed on the diluted solution. The filler 40 in the primer layer 20 accordingly tends to have a lower density than the filler 40 in the functional layer 30. Needless to say, in this embodiment, the proportion of the filler 40 in the resin composition used in the disposing step is equal to the proportion of the filler 40 in the resin composition used in the diluted solution applying step.

When the resin composition is disposed on the diluted solution, the residual solvent in the diluted solution allows part of the resin composition on the diluted solution to flow into the diluted solution in this embodiment. This phenomena is accelerated when the diluted solution has a high resin dissolving ability, and from this point of view, the solvent is preferably a ketone solvent. Heating the resin composition at this time promotes the flow of part of the resin composition into the diluted solution. In this case, the residual solvent is evaporated and replaced by the resin composition, and in subsequent curing of the resin composition, the density of the filler 40 in the primer layer 20 becomes lower than the density of the filler 40 in the functional layer 30. In this embodiment, many adjacent particles of the filler 40 in the functional layer 30 tend to be in contact with each other, and the filler 40 is not attracted to the solvent, so that the filler 40 basically does not travel to the diluted solution.

(Curing Step)

In the curing step in Step S64, the resin composition in the diluted solution and on the diluted solution is cured to form the primer layer 20 containing the resin obtained by curing the resin composition on the substrate 10 and the functional layer 30 containing the resin obtained by curing the resin composition on the primer layer 20. The resin composition is cured by, for example, UV irradiation.

As described above, in this embodiment, the residual solvent in the diluted solution allows part of the resin composition on the diluted solution to flow into the diluted solution, and the residual solvent is evaporated and replaced by the resin composition at this time. In this state, the resin composition is cured by UV, so that the density of the filler 40 in the primer layer 20 becomes lower than that of the filler 40 in the functional layer 30. The functional film 1 is accordingly produced in this embodiment, but an additional curing step (UV irradiation) may be performed after the curing step. In the curing step, the resin composition on the diluted solution may be cured while the resin composition is patterned with a mold.

(Production Equipment)

The production equipment 100 illustrated in FIG. 7 includes a supply roll 101, a gravure roll 102, the drying furnace 103, a die head 104, a first UV curing device 105, and a winding roll 106.

The substrate 10 is wound around the supply roll 101, and the supply roll 101 sends the substrate 10 to the gravure roll 102. The gravure roll 102 applies the diluted solution to the substrate 10 by transferring the diluted solution to the substrate 10. The drying furnace 103 dries the diluted solution by heating, with a heater, the substrate 10 having the diluted solution and transferred therein. The die head 104 applies the heated resin composition to the diluted solution on the substrate 10 having passed through the drying furnace 103. The first UV curing device 105 cures the resin composition by irradiating the resin composition with ultraviolet rays from the opposite side of the substrate 10 from the resin composition while pattering the resin composition with a roll 105A having a mold. The functional film 1 is then sequentially wound around the winding roll 106.

In the production equipment 100 having the above structure, the gravure roll 102 is involved in the diluted solution applying step. The drying furnace 103 is involved in the drying step. The die head 104 is involved in the disposing step. The first UV curing device 105 is involved in the curing step. The production equipment for producing the functional film 1 may be different from the production equipment 100. It is understood that the production process and the production equipment vary depending on the materials selected for forming the functional film.

The functional film 1 according to the embodiment described above includes the substrate 10, the primer layer 20 disposed on the substrate 10, and the functional layer 30 disposed on the primer layer 20. The primer layer 20 includes the filler 40, and the functional layer 30 includes the filler 40. With this configuration, the primer layer 20 improves close contact between the substrate 10 and the functional layer 30, while the filler 40 in the primer layer 20 and the filler 40 in the functional layer 30 provide an expected function. It is thus possible to improve close contact between the substrate 10 and the functional layer 30 easily and efficiently and favorably provide an expected function.

In this embodiment, the filler 40 in the primer layer 20 has a lower density than the filler 40 in the functional layer 30. With this configuration, the close contact between the substrate 10 and the primer layer 20 may be improved because less particles of the filler 40 in the primer layer 20 are in contact with the substrate 10. In addition, the close contact between the primer layer 20 and the functional layer 30 may be improved because there is a large contact area between the resin 21 and the resin 31 in the primer layer 20 and the functional layer 30.

In this embodiment, the primer layer 20 and the functional layer 30 contain the same resin. In this case, the resin 21 of the primer layer 20 and the resin 31 of the functional layer 30 have the same type of interface, and the primer layer 20 and the functional layer 30 may partially or entirely fuse with each other at the interface, and furthermore, the primer layer 20 and the functional layer 30 have the same, substantially the same, or close coefficient of linear expansion. This configuration improves close contact between the primer layer 20 and the functional layer 30 and as a result, improves close contact between the substrate 10 and the functional layer 30. When the resin 21 of the primer layer 20 is the same as the resin 31 of the functional layer 30, the material for forming the primer layer 20 is easily available because the material for forming the functional layer 30 can be used as the material for forming the primer layer 20. It is thus possible to improve close contact between the substrate 10 and the functional layer 30 easily and efficiently. The resin composition for forming the primer layer 20 corresponds to a first resin composition, and the resin composition for forming the functional layer 30 corresponds to a second resin composition. In this embodiment, the first resin composition is the same as the second resin composition. However, the first resin composition may be different from the second resin composition.

The substrate 10 has the permeation layer 12 adjacent to the primer layer 20 and formed by permeation of the resin contained in the primer layer 20 into part of the substrate 10. This configuration can efficiently improve close contact between the substrate 10 and the functional layer 30.

More specifically, the functional film 1 according to this embodiment has the following structure (1) or structure (2).

<Structure (1)>

The functional film 1 includes the substrate 10 containing an acetyl cellulose resin, the primer layer 20 containing the filler 40 and disposed on the substrate 10, and the functional layer 30 containing the filler 40 and disposed on the primer layer 20. The substrate 10 has the permeation layer 12 adjacent to the primer layer 20 and formed by permeation of the resin contained in the primer layer 20 into part of the substrate 10. The permeation layer 12 has a thickness of 0.1 µm or more and 3.5 µm or less. The primer layer 20 has a thickness of 0.1 µm or more and 1.0 µm or less. The filler 40 in the primer layer 20 and the filler 40 in the functional layer 30 are silica particles having an average particle size of 20 nm or more and 80 nm or less. The filler 40 in the primer layer 20 has a density of ⅓ or more and ¾ or less of the density of the filler 40 in the functional layer 30. The primer layer 20 and the functional layer 30 each contain a single resin. The single resin contained in the primer layer 20 is the same as the single resin contained in the functional layer 30.

<Structure (2)>

The functional film 1 or the functional film 1 includes the substrate 10 containing an acetyl cellulose resin, the primer layer 20 containing the filler 40 and disposed on the substrate 10, and the functional layer 30 containing the filler 40 and disposed on the primer layer 20. The substrate 10 has the permeation layer 12 adjacent to the primer layer 20 and formed by permeation of the resin contained in the primer layer 20 into part of the substrate 10. The permeation layer 12 has a thickness of 0.1 µm or more and 3.5 µm or less. The primer layer 20 has a thickness of 0.1 µm or more and 1.0 µm or less. The filler 40 in the primer layer 20 and the filler 40 in the functional layer 30 are silica particles having an average particle size of 20 nm or more and 80 nm or less. In the cross section of the functional layer 30 in the thickness direction, 90 particles or more and 150 particles or less of the filler 40 in the functional layer 30 are present per 0.5 µm². In the cross section of the primer layer 20 in the thickness direction, 15 particles or more and 45 particles or less of the filler 40 in the primer layer 20 are present per 0.2 µm². The primer layer 20 and the functional layer 30 each contain a single resin. The single resin contained in the primer layer 20 is the same as the single resin contained in the functional layer 30.

According to the structure (1) and the structure (2), it is possible to improve close contact between the substrate 10 and the functional layer 30 easily and efficiently and favorably provide an expected function. The structure (1) and the structure (2) are very advantageous especially in obtaining a desired optical function. The primer layer 20 in this embodiment forms the permeation layer 12 in the substrate 10 and may be bonded to the substrate 10 through the anchor effect and intermolecular attraction. The primer layer 20 in this embodiment includes the same resin as the functional layer 30 and, when both of the resins are cured simultaneously, may be bonded to the functional layer 30 through the anchor effect, intermolecular attraction, and chemical bonding. This configuration provides excellent close contact. The bonding state described above does not necessarily occur, and this bonding state does not limit the present disclosure. The structure (1) and the structure (2) correspond to example structures according to the present disclosure in which the primer layer 20 contains a single resin and the functional layer 30 contains a single resin, and the resin component of the primer layer 20 and the resin component of the functional layer 30 are the same and each composed of a single (one type of) resin.

<Modifications>

Figure 8:
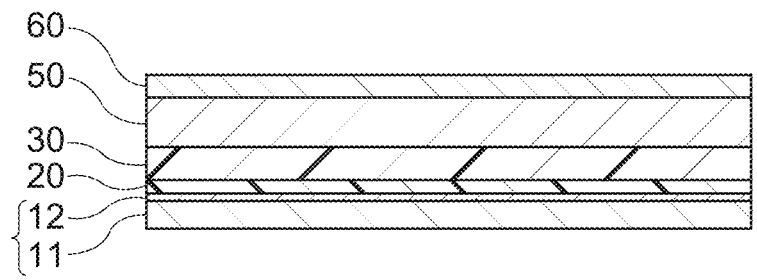
FIG. 8 is a schematic view of a functional film according to another modification.
Figure 9:
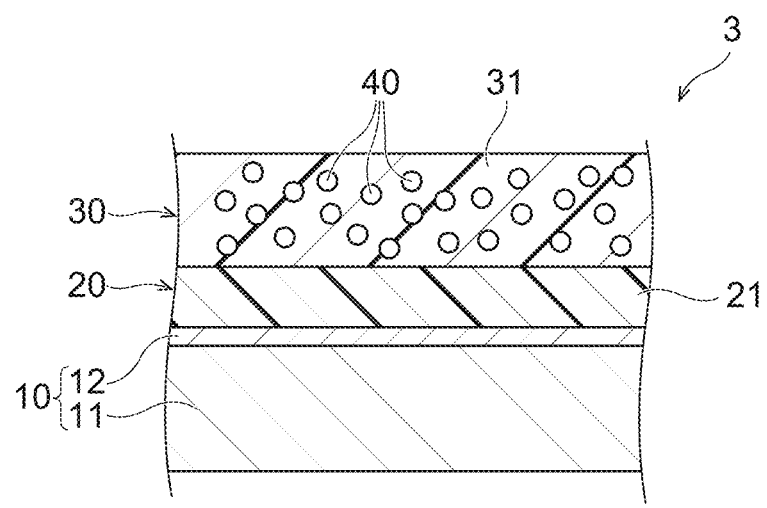
FIG. 9 is a schematic view of a functional film according to another modification.
Figure 10:
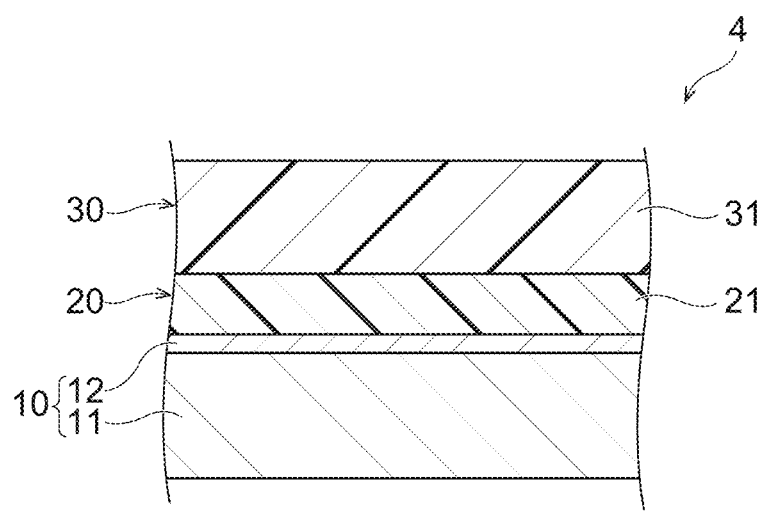
FIG. 10 is a schematic view of a functional film according to another modification.

Modifications of the functional film will be described below. FIG. 8 to FIG. 10 are schematic views of functional films 2 to 4 according to modifications. The same components of the following modifications as those in the embodiment described above are assigned with the same reference signs, and description thereof is omitted.

A functional film 2 illustrated in FIG. 8 further includes a first additional functional layer 50 and a surface protective layer 60, in addition to the substrate 10, the primer layer 20, and the functional layer 30 described above in the embodiment. The first additional functional layer 50 is disposed on the functional layer 30, and the surface protective layer 60 is disposed on the first additional functional layer 50.

To be more accurate, the first additional functional layer 50 is in direct contact with one of a pair of surfaces of the functional layer 30 that face each other in the thickness direction, the one surface being away from the primer layer 20. The surface protective layer 60 is in direct contact with one of a pair of surfaces of the first additional functional layer 50 that face each other in the thickness direction, the one surface being away from the functional layer 30.

The function of the first additional functional layer 50 may be, but not limited to, for example, an optical function, such as anti-glare or anti-reflection, hard coat, gas barrier, ensuring conductivity, ensuring magnetism, abrasion resistance, heat insulation, flame retardancy, or UV blocking. The first additional functional layer 50 may be made of an organic material, an inorganic material, or a combination of these materials. The surface protective layer 60 forms the outermost surface of the functional film 2.

A functional film 3 illustrated in FIG. 9 includes a substrate 10, a primer layer 20 disposed on the substrate 10, and a functional layer 30 disposed on the primer layer 20. The functional film 3 is different from the functional film in the embodiment described above in that the primer layer 20 is free of the filler 40.

In the functional film 3 according to this modification, the resin 21 contained in the primer layer 20 is also the same as the resin 31 contained in the functional layer 30. Therefore, the resin 21 of the primer layer 20 and the resin 31 of the functional layer 30 have the same type of interface, and the primer layer 20 and the functional layer 30 may partially or entirely fuse with each other at the interface, and furthermore, the primer layer 20 and the functional layer 30 have the same or substantially the same coefficient of linear expansion. This configuration improves close contact between the primer layer 20 and the functional layer 30 and as a result, improves close contact between the substrate 10 and the functional layer 30.

In the production of the functional film 3 according to this modification, a resin composition free of the filler 40 is used in the diluted solution applying step illustrated in FIG. 6. In the disposing step, the resin composition disposed on the diluted solution after drying contains the filler 40. The component of the resin composition used in the disposing step other than the filler 40 is the same as the resin composition diluted with the diluted solution in the diluted solution applying step. In this modification, the flow phenomenon of the resin composition can be generated as appropriate by leaving the residual solvent in the diluted solution and leaving the resin composition uncured in the drying step, or disposing the heated resin composition in the disposing step.

The functional film 4 illustrated in FIG. 10 includes a substrate 10, a primer layer 20 disposed on the substrate 10, and a functional layer 30 disposed on the primer layer 20. The primer layer 20 and the functional film 30 are both free of the filler 40.

In the functional film 4 according to this modification, the resin 21 contained in the primer layer 20 is also the same as the resin 31 contained in the functional layer 30. Therefore, the resin 21 of the primer layer 20 and the resin 31 of the functional layer 30 have the same type of interface, and the primer layer 20 and the functional layer 30 may partially or entirely fuse with each other at the interface, and furthermore, the primer layer 20 and the functional layer 30 have the same or substantially the same coefficient of linear expansion. This configuration improves close contact between the primer layer 20 and the functional layer 30 and as a result, improves close contact between the substrate 10 and the functional layer 30.

In the production of the functional film 4 according to this modification, a resin composition free of the filler 40 is used in the diluted solution applying step illustrated in FIG. 6. In the disposing step, the resin composition disposed on the diluted solution after drying is also free of the filler 40. The resin composition used in the diluted solution applying step is the same as the resin composition used in the disposing step. The flow phenomenon of the resin composition can be generated as appropriate by leaving the residual solvent in the diluted solution and leaving the resin composition uncured in the drying step, or disposing the heated resin composition in the disposing step.

EXAMPLES

Next, Examples and Comparative Example of specific products of the functional film according to the embodiment, and the evaluation results of performance comparison will be described.

Example 1

A functional film according to Example 1 includes a substrate 10, a primer layer 20 disposed on the substrate 10, and a functional layer 30 disposed on the primer layer 20. The primer layer 20 and the functional layer 30 contain the same resin. In other words, the primer layer 20 and the functional layer 30 are formed by polymerization of the same resin composition. The resin composition contains the filler 40. The primer layer 20 and the functional layer 30 are formed such that the filler 40 in the primer layer 20 has a lower density than the filler 40 in the functional layer 30. In the substrate 10, a permeation layer 12 is formed.

The details of the materials for forming each part in Example 1 are as described below.

The substrate 10 is a TAC film having a thickness of 80 μm.

The resin composition is an ionizing radiation-curable resin containing the filler 40. More specifically, the resin composition is pentaerythritol tri(meth)acrylate.

The filler 40 is silica particles. The silica particles have an average particle size of 65 nm.

The solvent used to dilute the resin composition is a mixture of MEK and MIBK.

Example 2

A functional film according to Example 2 is the same as in Example 1 except that the filler 40 in the primer layer 20 has the same density as the filler 40 in the functional layer 30.

Comparative Example

A functional film according to Comparative Example is formed by directly disposing a resin composition containing a filler on a substrate and then curing the resin composition. In other words, the functional film according to Comparative Example does not have a permeation layer or a primer layer. The materials of the substrate, the filler, and the resin composition are the same as in Examples 1 and 2.

(Evaluation Results)

To evaluate the functional films according to Examples and Comparative Example, the close contact was evaluated by the cross-cut method. Specifically, a cut was made in a lattice pattern on the surface of each functional film by using a cross cut CCJ-1 (available from COTEC) in accordance with JIS K5600-5-6:1999 to prepare a pattern of 100 squares of side 1 mm each. Industrial Cellotape (registered trademark) 24 mm wide available from Nichiban Co., Ltd. was attached onto the lattice pattern and rubbed with a spatula for 10 reciprocations to make close contact, and rapidly peeled off in the 1500 direction. This process was repeated 5 times, and the number of remaining squares was counted. The functional films were evaluated based on the number of remaining squares in the numerator and the total number of squares in the denominator. In this evaluation, the larger the number of remaining squares, the higher the close contact is rated. This evaluation was performed on the functional films in the initial state just after production and the functional films after 300 cycles of the temperature cycle test at environmental temperatures from −40° C. to 85° C.

The evaluation results are as described in the following table.

TABLE 2

|  | EXAMPLE 1 (PRIMER LAYER WITH LOW FILLER DENSITY) | EXAMPLE 2 (PRIMER LAYER WITH THE SAME FILLER DENSITY AS FUNCTIONAL LAYER) | COMPARATIVE EXAMPLE (NO PRIMER LAYER) |
|---|---|---|---|
| INITIAL STATE | 100/100 | 100/100 | 0/100 |
| AFTER TEMPERATURE CYCLE TEST | 100/100 | 98/100 | 0/100 |

In Example 1, all of 100 squares remained in the functional film in the initial state and after the temperature cycle test. In Example 2, all of 100 squares remained in the functional film in the initial state, and 98 squares out of 100 squares remained in the functional film after the temperature cycle test. In Comparative Example, all of 100 squares were peeled off from the functional film in the initial state and after the temperature cycle test. In other words, the functional layer in all of 100 squares was peeled off from the substrate.

These evaluation results indicate that the functional films according to Examples show high close contact. It is also confirmed that the close contact is further improved especially when the filler 40 in the primer layer 20 has a lower density than the filler 40 in the functional layer 30.

The embodiments and Examples of the present invention are described above, but various modifications may be added to the embodiments. These modifications may also be within the technical scope of the present invention.

The invention claimed is:

1. A functional film comprising:
a substrate containing an acetyl cellulose resin;
a primer layer containing a filler and disposed on the substrate; and
a functional layer containing a filler and disposed on the primer layer,
wherein the substrate has a permeation layer adjacent to the primer layer and formed by permeation of a resin contained in the primer layer into part of the substrate, and the permeation layer has a thickness of 0.1 μm or more and 3.5 μm or less;
the primer layer has a thickness of 0.1 μm or more and 1.0 μm or less;
the filler in the primer layer and the filler in the functional layer are silica particles having an average particle size of 20 nm or more and 80 nm or less;
the filler in the primer layer has a density of ⅓ or more and ¾ or less of a density of the filler in the functional layer; and
the primer layer and the functional layer each contain a resin, and the primer layer has the same resin component as the functional layer.

2. A functional film comprising:
a substrate containing an acetyl cellulose resin;
a primer layer containing a filler and disposed on the substrate; and
a functional layer containing a filler and disposed on the primer layer,
wherein the substrate has a permeation layer adjacent to the primer layer and formed by permeation of a resin contained in the primer layer into part of the substrate, and the permeation layer has a thickness of 0.1 μm or more and 3.5 μm or less;
the primer layer has a thickness of 0.1 μm or more and 1.0 μm or less;
the filler in the primer layer and the filler in the functional layer are silica particles having an average particle size of 20 nm or more and 80 nm or less;
in a cross section of the functional layer in a thickness direction, 90 particles or more and 150 particles or less of the filler in the functional layer are present per 0.5 μm$^2$;
in a cross section of the primer layer in the thickness direction, 15 particles or more and 45 particles or less of the filler in the primer layer are present per 0.2 μm$^2$; and
the primer layer and the functional layer each contain a resin, and the primer layer has the same resin component as the functional layer.

3. A functional film comprising:
a substrate containing an acetyl cellulose resin;
a primer layer containing a filler and disposed on the substrate; and
a functional layer containing a filler and disposed on the primer layer,
wherein the substrate has a permeation layer adjacent to the primer layer and formed by permeation of a resin contained in the primer layer into part of the substrate, and the permeation layer has a thickness of 0.1 μm or more and 3.5 μm or less;
the primer layer has a thickness of 0.1 μm or more and 1.0 μm or less;
the filler in the primer layer and the filler in the functional layer are silica particles having an average particle size of 20 nm or more and 80 nm or less;
in a cross section of the primer layer in a thickness direction, 15 particles or more and 45 particles or less of the filler in the primer layer are present per 0.2 μm$^2$; and
the primer layer and the functional layer each contain a resin, and the primer layer has the same resin component as the functional layer.

4. A functional film comprising:
a substrate containing an acetyl cellulose resin;
a primer layer containing a filler and disposed on the substrate; and
a functional layer containing a filler and disposed on the primer layer,
wherein the substrate has a permeation layer adjacent to the primer layer and formed by permeation of a resin contained in the primer layer into part of the substrate, and the permeation layer has a thickness of 0.1 μm or more and 3.5 μm or less;
the primer layer has a thickness of 0.1 μm or more and 1.0 μm or less;
the filler in the primer layer and the filler in the functional layer are silica particles having an average particle size of 20 nm or more and 80 nm or less;
the filler in the primer layer has a density of 15% or more and 30% or less in a cross section of the primer layer in a thickness direction; and the primer layer and the functional layer each contain a resin, and the primer layer has the same resin component as the functional layer.

* * * * *